US010578191B2

(12) United States Patent
Campbell

(10) Patent No.: US 10,578,191 B2
(45) Date of Patent: Mar. 3, 2020

(54) ADVANCED STRANDED CABLE TERMINATION METHODS AND DESIGNS

(71) Applicant: Richard V Campbell, Havana, FL (US)

(72) Inventor: Richard V Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 591 days.

(21) Appl. No.: 14/693,811

(22) Filed: Apr. 22, 2015

(65) Prior Publication Data
US 2015/0300452 A1  Oct. 22, 2015

Related U.S. Application Data

(60) Provisional application No. 61/982,825, filed on Apr. 22, 2014.

(51) Int. Cl.
F16G 11/04 (2006.01)
F16G 11/02 (2006.01)

(52) U.S. Cl.
CPC .......... *F16G 11/042* (2013.01); *F16G 11/025* (2013.01)

(58) Field of Classification Search
CPC .......... Y10T 403/11; Y10T 403/32032; Y10T 403/32073; Y10T 403/32074; Y10T 24/3909; F16G 11/00; F16G 11/04; F16G 11/025; F16G 11/042; E04C 5/122; F16B 1/04; F16B 11/004
USPC ............................................. 403/2, 56, 131
See application file for complete search history.

(56) References Cited

U.S. PATENT DOCUMENTS

| | | | | | |
|---|---|---|---|---|---|
| 1,577,003 | A | * | 3/1926 | Sunderland | F16G 11/042 24/122.3 |
| 2,341,922 | A | * | 2/1944 | Robbins | F16G 11/048 294/102.1 |
| 3,475,795 | A | * | 11/1969 | Youngblood | F16G 11/05 174/135 |
| 3,548,432 | A | * | 12/1970 | Durkee | E01D 19/14 14/18 |
| 3,775,811 | A | * | 12/1973 | Smrekar | F16G 11/05 174/DIG. 12 |
| 3,803,785 | A | * | 4/1974 | Finsterwalder | E01D 19/14 24/122.6 |
| 3,909,142 | A | * | 9/1975 | Surr | E04C 5/12 24/122.6 |

(Continued)

FOREIGN PATENT DOCUMENTS

| | | | | | |
|---|---|---|---|---|---|
| EP | 53955 | A | * | 6/1982 | |
| EP | 2594700 | B1 | * | 2/2017 | E02D 5/58 |

(Continued)

Primary Examiner — Matthieu F Setliff
(74) Attorney, Agent, or Firm — J. Wiley Horton

(57) ABSTRACT

Advanced components that are useful in providing a compact overall cable termination for a multi-stranded cable and in providing for the control and inspection of the individual components of a multi-stranded cable. Multiple individual cable strands are provided with a termination on their free end. These terminations are connected to a collector. An advanced collar is provided that assists in the transition of the strands as they leave the collector and transition to the structure found in the free portion of the cable.

10 Claims, 15 Drawing Sheets

(56) References Cited

U.S. PATENT DOCUMENTS

| | | | | |
|---|---|---|---|---|
| 3,967,421 A * | 7/1976 | Dufossez | ............... | E01D 19/14 52/146 |
| 4,192,114 A * | 3/1980 | Jungwirth | ................. | E04C 5/12 52/223.13 |
| 4,235,055 A * | 11/1980 | Schambeck | ............ | E01D 19/14 52/223.13 |
| 4,473,915 A * | 10/1984 | Finsterwalder | ......... | E01D 19/14 14/18 |
| 4,648,146 A * | 3/1987 | Nutzel | .................... | E01D 19/14 14/21 |
| 4,770,491 A * | 9/1988 | Champa | ............... | G02B 6/4439 174/79 |
| 4,878,327 A * | 11/1989 | Nutzel | ...................... | E01D 2/04 52/223.13 |
| 5,289,626 A * | 3/1994 | Mochida | .................. | E02D 5/76 29/452 |
| 5,469,677 A * | 11/1995 | Luthi | ...................... | E04C 5/122 24/122.6 |
| 6,578,329 B1 * | 6/2003 | Stubler | .................. | E01D 19/14 24/122.6 |
| 6,748,708 B1 * | 6/2004 | Fuzier | ..................... | E01D 19/14 24/122.6 |
| 7,857,542 B2 * | 12/2010 | Burtscher | ................. | E04C 5/07 403/369 |
| 8,371,015 B2 * | 2/2013 | Campbell | ............ | F16G 11/042 29/525.01 |
| 8,621,725 B2 * | 1/2014 | Ortiz | ........................ | H02G 9/06 174/74 R |
| 2012/0297694 A1 * | 11/2012 | Kim | ........................ | E04C 5/122 52/1 |
| 2014/0137388 A1 * | 5/2014 | Campbell | ............ | F16G 11/025 29/461 |
| 2014/0338168 A1 * | 11/2014 | Campbell | ............ | F16G 11/025 29/426.2 |
| 2015/0315743 A1 * | 11/2015 | Campbell | ............... | F16B 39/20 57/310 |
| 2016/0168855 A1 * | 6/2016 | Brand | ..................... | E04C 5/122 52/223.13 |

FOREIGN PATENT DOCUMENTS

| | | | | |
|---|---|---|---|---|
| GB | 794561 A * | 5/1958 | ............ | E04C 5/122 |
| GB | 838057 A * | 6/1960 | ............ | F16G 11/025 |
| WO | WO-9839532 A1 * | 9/1998 | ........... | B63B 21/502 |

* cited by examiner

ADVANCED STRANDED CABLE TERMINATION METHODS AND DESIGNS

CROSS-REFERENCES TO RELATED APPLICATIONS

This non-provisional patent application claims the benefit of an earlier-filed provisional application. The first provisional application was assigned Ser. No. 61/982,825. It listed the same inventor.

BACKGROUND OF THE INVENTION

1. Field of the Invention

This invention relates to the field of tensile strength members such as multi-stranded cables made of synthetic filaments. More specifically, the invention comprises devices and methods for creating a more compact overall cable termination, improved control over strand position and alignment, and improved inspectability.

2. Description of the Related Art

A cable must generally be provided with one or more end connections in order to be useful. The end connections allow the cable to carry and transmit a useful load. An end connection may be a simple device—such as a large hook—employed to connect the cable to an anchoring point. Larger synthetic cables typically include multiple constituent strands. It is preferable to attach an individual connective device to each strand. Such a connective device is referred to in this disclosure as a "strand termination." Multiple strand terminations are connected together somehow to create a unified cable end connection. The unified cable end connection is referred to in this disclosure as an "overall cable termination."

Some terminology used in the construction of cables will benefit the reader's understanding, though it is important to know that the terminology varies within the industry. For purposes of this patent application, the smallest individual component of the synthetic cable is known as a "filament." A filament is often created by an extrusion process (though others are used). Many filaments are grouped together to create a strand. The filaments are braided and/or twisted together using a variety of known techniques in order to create a cohesive strand. There may also be sub-groups of filaments within each strand.

Not all strands are made up of interwoven filaments. Some strands include parallel filaments encased by an encircling jacket. Whatever the construction, as the overall cable size gets larger, more and more layers of filament organization will typically be added.

FIG. 1 shows a depiction of a cable having multiple strands where all the strands are attached to a common collector. Each individual strand 12 is joined to a strand termination 30 on its free end. All the terminations 30 are then attached in some fashion to collector 34. The completed assembly is referred to as overall cable termination 132. (The reader should note that FIG. 1 is discussed at this point to introduce some of the terminology. Many of the components depicted m FIG. 1 are not prior art—as will be explained).

Regardless of the type of strand termination, the size of the strand termination is invariably larger than the diameter of the strand itself. For this reason, the strands must diverge somewhat as they approach the collector—in order to make additional room for the larger bulk of the terminations. The nature of this divergence is dictated somewhat by the construction of the cable itself. While the overall cable has a central axis, in most cases the individual strands do not tend to be parallel to this axis (There are cables having parallel strands within an encircling jacket). Instead, they are more commonly helically wrapped or braided around the central axis. The selected structure (braiding, plaiting, serving, laying, winding, etc.) is intact for most of a cable's length. The length where this structure is intact is called the "free cable." However, in order to add the desired strand terminations to each individual strand, the flee cable's structure must be "unbound" as it nears the collector. Each strand must undergo a transition from its orientation within the free cable structure to an orientation that is suitable for attachment to the collector. For a cable having parallel strands, a reorientation does not occur but a divergence between the strands must still occur.

The preferred transition from the free cable to the collector depends largely on the construction of the cable itself. A common construction approach is taken from the historical constructions used for wire rope. A "1×19" is made using one core strand wrapped with six strands wrapped with twelve strands. Other variations of the wire lay approach include "1×7" (six strands around one strand) and "1×36" (one core strand wrapped with six strands wrapped with twelve strands wrapped with seventeen strands).

Many different materials are used for the filaments in a synthetic cable. These include DYNEEMA (ultra-high-molecular weight polyethylene), SPECTRA (ultra-high-molecular weight polyethylene), TECHNORA (processed terephhthaloyl chloride), TWARON (para-aramid), KEVLAR (para-aramid), VECTRAN (liquid crystal polymer), PBO (polybenzobisoxazole), carbon fiber, nano-tube fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is applicable to terminations made of such high-strength filaments, for reasons which will be explained in the descriptive text to follow. While the invention could in theory be applied to older cable technologies—such as wire rope—it likely would offer little advantage and the additional time and expense of implementing the invention would not be worthwhile. Thus, the invention is not really applicable to wire rope and other similar cables made of very stiff elements.

FIG. 2 shows a section view through one example of a strand termination 30 that has been added to the free end of an individual strand 12. The prior art approaches to adding a termination are explained in detail in commonly-owned U.S. Pat. No. 7,237,336, which is hereby incorporated by reference. FIG. 2 shows a sectional view through the components used to create an exemplary termination using the potting approach. The reader will note that anchor 18 includes an expanding cavity 20 that expands as one proceeds from the portion of the anchor facing the length of cable (the "proximal" end, which is the bottom end in the orientation of the view) toward the portion of the anchor facing in the opposite direction (the "distal" end, which is the top end in the orientation of the view). The expanding cavity in this example is a linear taper between two straight portions. Differing wall profiles may be used to create a wide variety of expanding cavities.

The end portion of strand 12 is potted into the expanding cavity in order to lock anchor 18 to strand 12. The filaments of the strand are splayed apart and infused with liquid potting compound (either before or after being placed within expanding cavity 22). The liquid potting compound may be added by a variety of methods, including: (1) "painting" or otherwise wetting the filaments with potting compound and then sliding the anchor into position over the painted filaments, (2) positioning the splayed filaments in the cavity and then pouring in potting compound, (3) pre-wetting the filaments in a separate mold designed to wet the filaments, and (4) injecting pressurized potting compound into the cavity. However the potting compound is introduced, the splayed filaments remain within cavity 20 while the potting compound hardens. Once it has hardened the result is a mechanical interlock between the filament-reinforced "plug" (contained in potted region 22) of solid material and the cavity. Tension applied to the cable will thereby be transmitted to the strand.

The potting compound used is typically a high-strength resin. However, the term "potting compound" as used in this description means any substance which transitions from a liquid to a solid over time.

Potting is only one approach known in the art. Other common examples include "spike-and-cone" or "spike-and-barrel" designs, compression or friction fittings, composite-connections, capstan wrapping, etc. The most common approach is wrapping a length of filaments around an eye on the end of the strand and splicing a length of the strand back into itself—typically referred to as a "spliced eye." The present invention is applicable to any method of creating a termination on the end of a synthetic filament tensile member. Although potted examples are shown in these descriptions the invention is not limited to that approach.

FIG. 2 shows additional exemplary components that are added to facilitate the gathering of multiple strands into a single, load-transferring element. In the example shown, loading stud 24 has been connected to anchor 18 via threaded engagement 28. Loading stud 24 includes male thread 26 over a significant length. This threaded stud allows the completed assembly to be attached to another component.

As stated previously, the size of the termination added to a strand is invariably larger than the diameter of the strand itself. The strand termination also has a length which is typically several strand diameters. In the case of a spliced termination, the length may be over 25 strand diameters. Thus, the geometry of the device to which the terminations are connected (the "collector") is often driven by the bulk and configuration of the strand terminations rather than the bulk of the strands themselves. The present invention seeks to reduce the bulk of the overall cable termination, among other objectives. The present invention also seeks to improve the control of the individual strands and the inspectability of the strands.

BRIEF SUMMARY OF THE PRESENT INVENTION

The present invention comprises advanced components that are useful in providing a compact overall termination for a multi-stranded synthetic filament cable and in providing for the inspection of the individual components of a multi-stranded cable termination. Multiple individual cable strands are provided with a strand termination on their free end. These strand terminations are connected to a collector to form an overall cable termination. An advanced collar is provided that reroutes the s the strands as they leave the collector and controls the transition to the structure found in the free portion of the cable. The advanced collar often shortens the length required for the transition from the collector to the free portion of the cable.

In addition, offsets in the location and/or orientation of some terminations with respect to their neighbors allows a reduction in the bulk of the overall cable termination. The components used preferably facilitate the inspection of the cable strands for wear, alignment, securement, and/or loading.

DETAILED DESCRIPTION OF THE INVENTION

Figure 1:
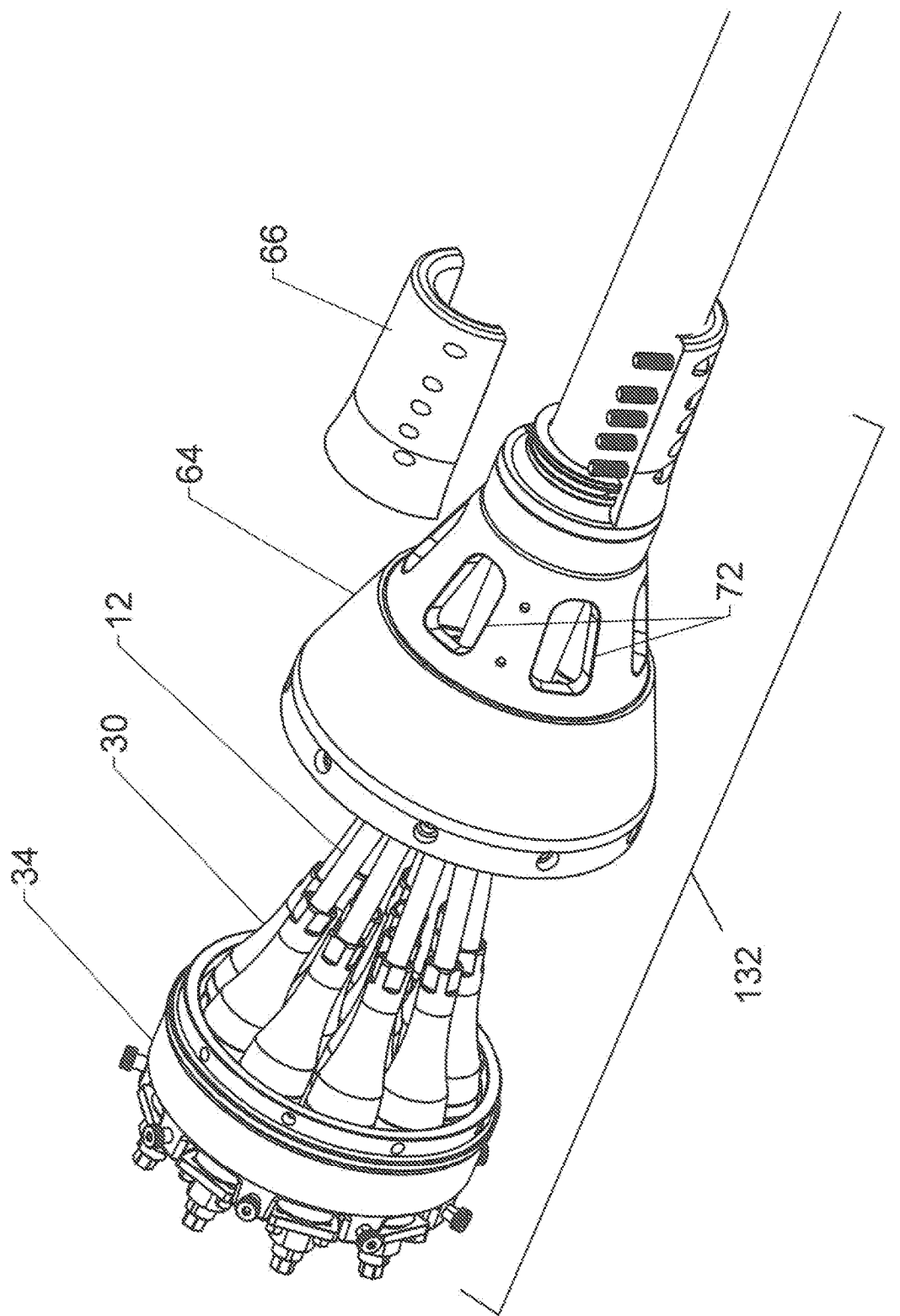
FIG. 1 is an exploded perspective view, showing a collector assembly and associated strand collars.

In many of the inventive embodiments it is advantageous to create sub-groups of strands within the overall synthetic cable. Many different groupings are possible. However, there are certain groupings that allow improved geometry for the overall cable termination while maintaining balanced strand loading. Examples of the ideal groupings are provided in the following:

Example One—12 Strand

Synthetic cables having twelve individual strands are common. When braided, this construction includes six strands helically wound in a first direction and six strands helically wound in the opposite direction. The two groups are interwoven. Twelve strand cables are also made with parallel strands.

Several different strand groupings are possible for a twelve strand cable. The first variation will be referred to as a "12×1 collection pattern." This groups the 12 strands in a circular cross section. This design aligns both "S" and "Z" twist strands and matches the natural construction (which is a hollow circle). The "12×1" structure is highly balanced but does tend to produce a fairly large expansion in cross-section as the strand terminations are added and the connections to the collector are made.

The second variation will be referred to as a "9×3 collection pattern." This arrangement includes three "core" strands in the center and nine outer strands. This configuration is often ideal from a spacing standpoint. Importantly, while not ideally balanced, what makes this construction possible is the fact that three of the twelve strands will tend to be pushed toward the center of the cross section when the cable is placed under tension. Thus, if one were to take a cross section of a twelve strand rope in use, while the braid is hollow three of the strands will tend to collapse into the hollow space in the middle of the cross section. With this in mind, these three center strands can be separately grouped to create a more idealized grouping while not significantly impacting tension balance between strands. This variation can allow for a more streamlined overall cable termination since the three core strands may be connected to the collector in a different plane from the other nine strands (or some other approach may be applied to increase volumetric efficiency).

The third variation will be referred to as an "8×4 collection pattern." As one would expect, this approach uses four core strands and eight outer strands. In some cases four strands may migrate toward the center when a cable is placed under tension, and in this case it may be possible to use a similar termination scheme to that described for the "9×3."

The fourth variation will be referred to as a "6×6 collection pattern." In this approach two six-strand groups are created. They need not be organized as "core" and "outer" groups. For example, the first group may be a set of helices with a right-hand twist and the second group may be a set of helices with a left-hand twist. A 6×6 is similar to that of the 12×1 in that it keeps those strands within a primary orientation the same. Unlike the 12×1 however, it provides a more compact outer diameter and additionally many unique configurations such as those described above and illustrated herein.

Example Two—8 Strand

Synthetic cables having eight strands are also common. When braided, this construction includes four strands helically wound in a first direction and four strands helically wound in the opposite direction. The strands are braided together. Eight-stranded cables having a parallel construction are also known. Whether braided or parallel, several idealized strand groupings are possible for such a cable.

The first variation will be referred to as an "8× collection pattern" which includes eight strands in a circular cross pattern. The second variation will be referred to as a "5×3 collection pattern" which wraps five outer strands around a core group of three strands. The third variation is a "4×4 collection pattern" in which two sub-groups of four strands each are created. The anticipated benefits for each of these collection pattern are generally the same as those described previously for the twelve strand variations.

This disclosure encompasses several different combinations configured to create a more space-efficient, controlled, and inspectable overall cable termination. FIG. 1 shows an exploded view with several cooperative components. A strand termination 30 of some form is provided on the end of each strand 12 (he particular type of strand termination used is not important to the present invention so long as it effectively communicates a load). The strand terminations are connected to collector 34. Middle strand collar 64 encircles the expanding portion of the strands. Distal strand collar 66 (split into two halves in this embodiment) likewise encircles the strands.

In some embodiments the middle strand collar will redirect the path of the strands and in some embodiments the distal strand collar will redirect the strands. In still other embodiments the redirection will be performed by both the middle and distal strand collars.

One of the operational concerns of such an assembly is that a very significant portion of each strand—the portion where it interacts with its strand termination or where the strand interacts with other internal components such as other strands or the strand collar—becomes concealed from view and is therefore no longer inspectable. It is preferable to make the strand collars removable or to provide suitable inspection ports 72 in suitable areas when removability is not desired. The features permitting inspection could reside anywhere in the assembly, including (1) at the top to allow the inspection of the connection point, (2) on the side to allow the inspection of the strand terminations and strand alignment, and (3) at the lower region to allow the inspection for wear.

Figure 3:
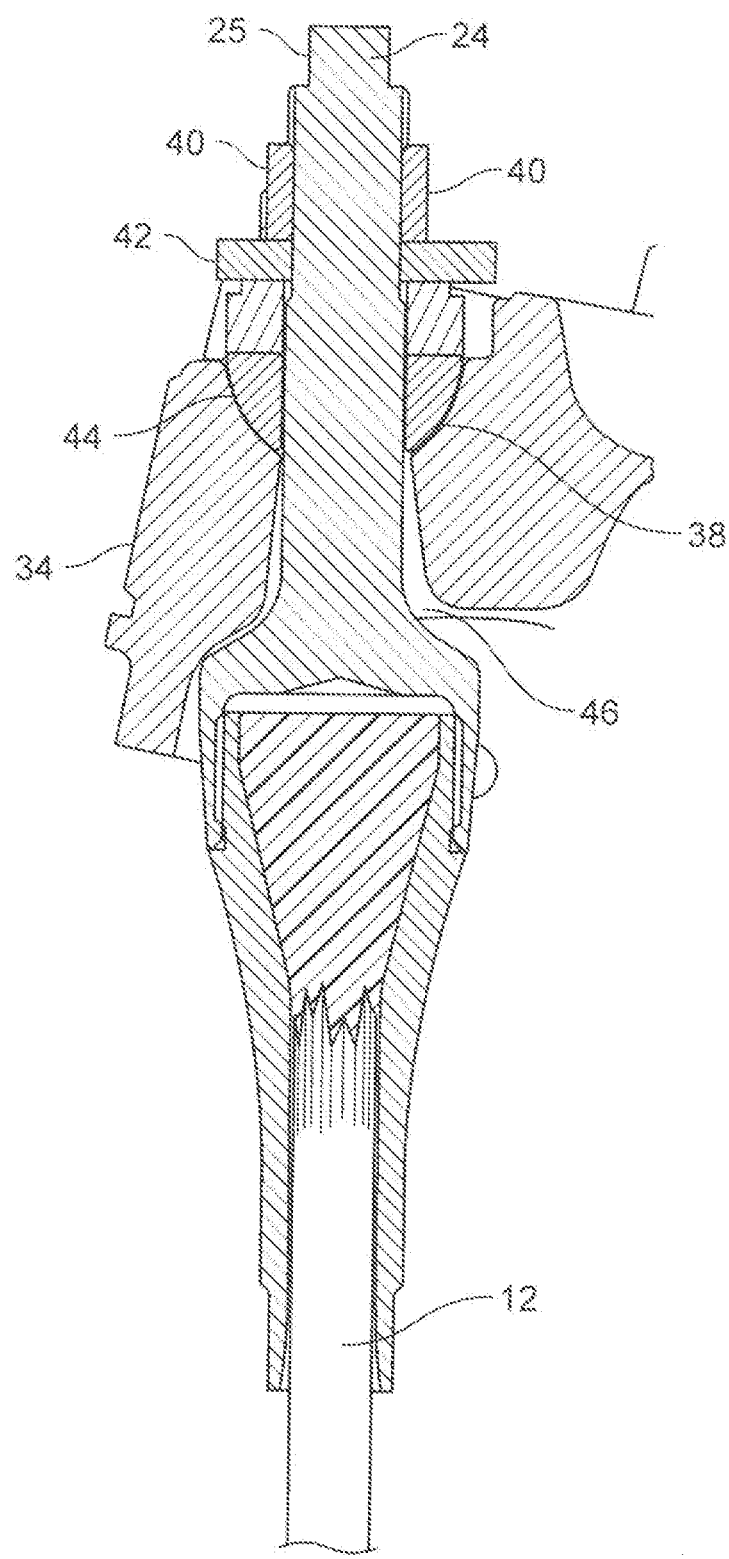
FIG. 3 is a sectional perspective view, showing how the exemplary termination of FIG. 2 can be attached to a collector used to assemble multiple terminations.

As stated previously, each strand termination is typically connected to a collector. FIG. 3 illustrates one exemplary approach to connecting a strand termination to a collector. The term "collector" should be broadly understood to encompass any device or combination of devices that link multiple strand terminations together. Loading stud 24 is passed through opening 46 and through receiver 38 in collector 34. Receiver 38 includes a hemispherical concave portion sized to accept hemi bearing 44. Hemi bearing 44 and receiver 38 form a ball-and-socket connection that allows the termination to rotate with respect to collector 34. This represents a "high-end" connection. Many other connections will not include a loading stud, washer, or ball-and-socket joint.

Overall tension to the cable will generally be applied by collector 34. However, the nuts 40 on each individual strand termination can be used to "fine tune" the tension on each strand and thereby balance the load. Nut 40 can be selectively tightened on loading stud 24 in order to urge washer 42 against hemi bearing 44 and hemi bearing 44 against receiver 38 and thereby perform the fine tuning. The ball-and-socket connection allows the strand to align itself during this process.

FIG. 3 ably illustrates how the "footprint" of a single connection between a strand and the collector is much larger than the strand itself. The size, shape, and type of strand termination 30 will vary greatly depending on many factors. However, it is always bulkier than the strand itself. This fact drives the geometry needed for the collector. When the strands are assembled in the body of the cable (such as by braiding, plaiting, etc.) there is very little wasted space between strands. However, the strands must be "uncompacted" in the region of the collector in order to allow for all the additional components needed to create the strand-to-collector connection.

Figure 5:
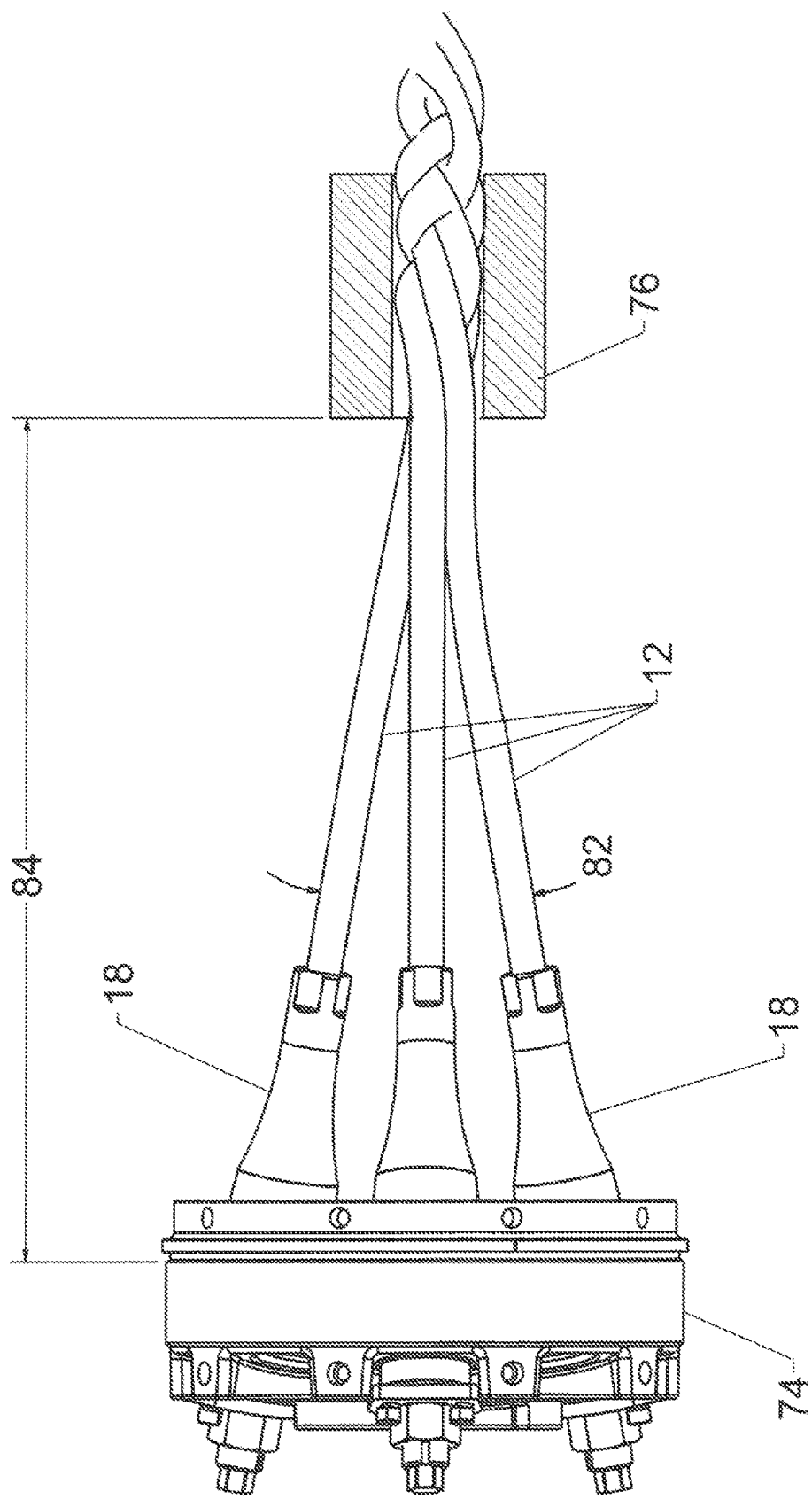
FIG. 5 is an elevation view with a partial section, showing a typical divergence angle for a multi-stranded collector.

FIG. 5 illustrates a very simple scenario of connecting three strands 12 to 3-strand collector 74. The three strands are wrapped in a tight and compact helix in free cable 80. The strands expand through divergence angle 82 in order to intersect the locations for the connections to 3-strand collector 74. When the cable is loaded in tension, the separation point between the strands will tend to migrate down the cable (further into free cable 80) unless some type of constraining component is put in place. Collar 76 may be used to prevent this. However, the reader will observe that the fairly shallow divergence angle 82 creates a long divergence length 84. Since it is desirable to reduce the overall length and bulk of the overall cable termination, it is preferable to add other components.

Figure 6:
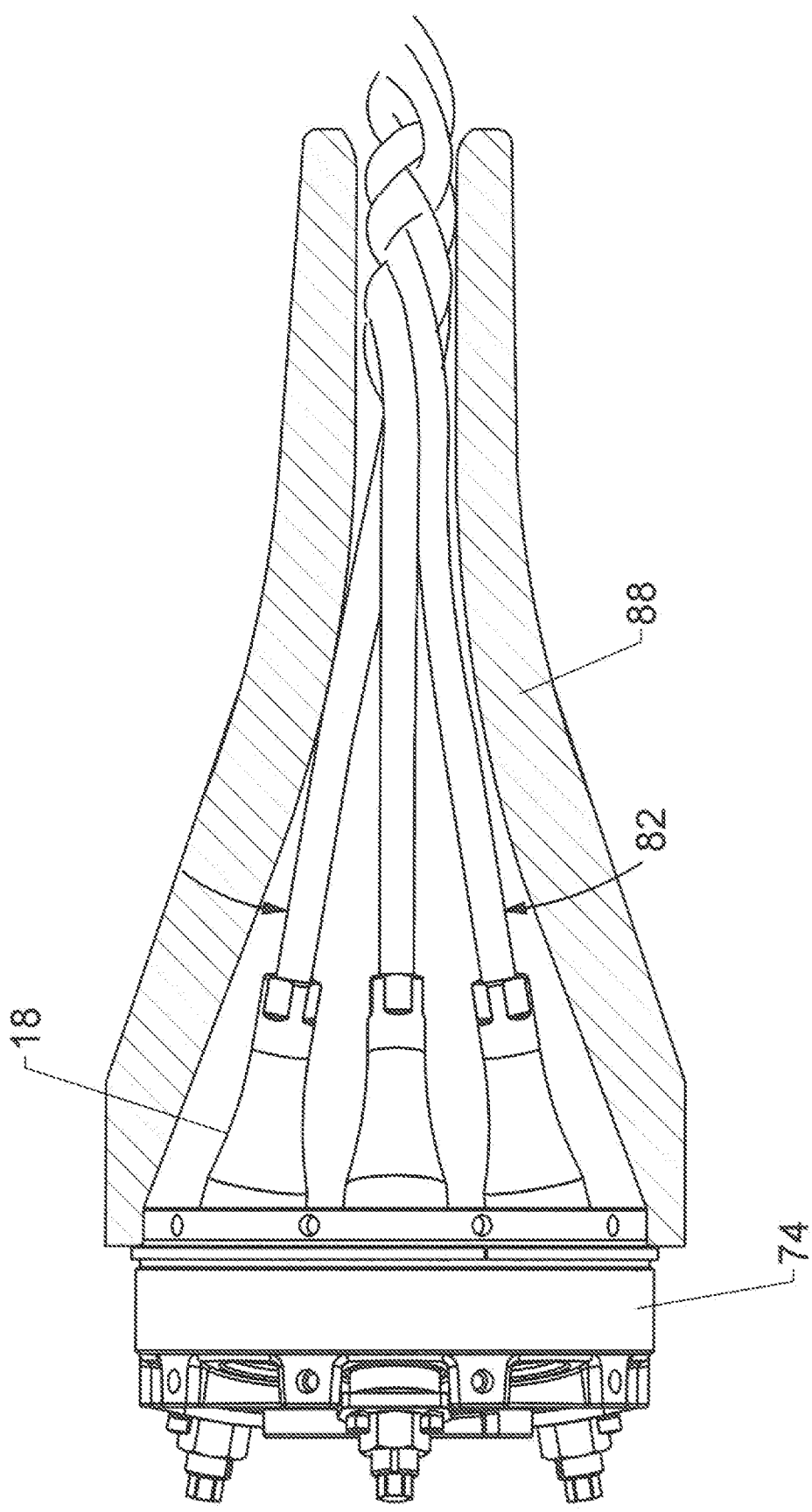
FIG. 6 is an elevation with a partial section, showing an improved divergence angle created with the present invention.

FIG. 6 shows one exemplary solution. Advanced collar 88 has been added. This component is connected to 3-strand collector 74 in any suitable fashion so that it remains in place with respect to the collector. Contoured converging surface 86 is added on the inward-facing side of the collar (The advanced collar is preferably radially symmetric). The contoured converging surface smoothly reroutes the three strands together so that they may be transitioned into the free cable state in a shorter overall length. The rerouting in this example is done in a smooth contour so that localized stresses and wear from abrasion are minimized. The rerouting is configured so that reasonable and manageable stress and wear on the cable strands is created. The term "rerouting" is understood to be a modification of the route the strands would take in the absence of a strand collar (In the absence of a strand collar they would be straight from the strand termination to the point where they enter the construction of the free cable).

In this example, the advanced collar also assists in reducing stress at the point where the free cable emerges. Contoured diverging surface 90 allows the cable to be offset somewhat from the centerline of 3-strand collector 74 without producing undue stress. A bendable region can also be provided at this point—using a flexible material such as a urethane.

Even for those embodiments where the strand collar does not reroute the strands, it still provides a restriction on the lateral motion of the strands. The overall cable has a central axis. The term "lateral" is understood to mean a direction that is perpendicular to the cable's central axis. When the cable is bent with respect to the overall cable termination, some fo he strands will tend to move laterally. The presence of the strand collar inhibits this lateral motion.

Figure 7:
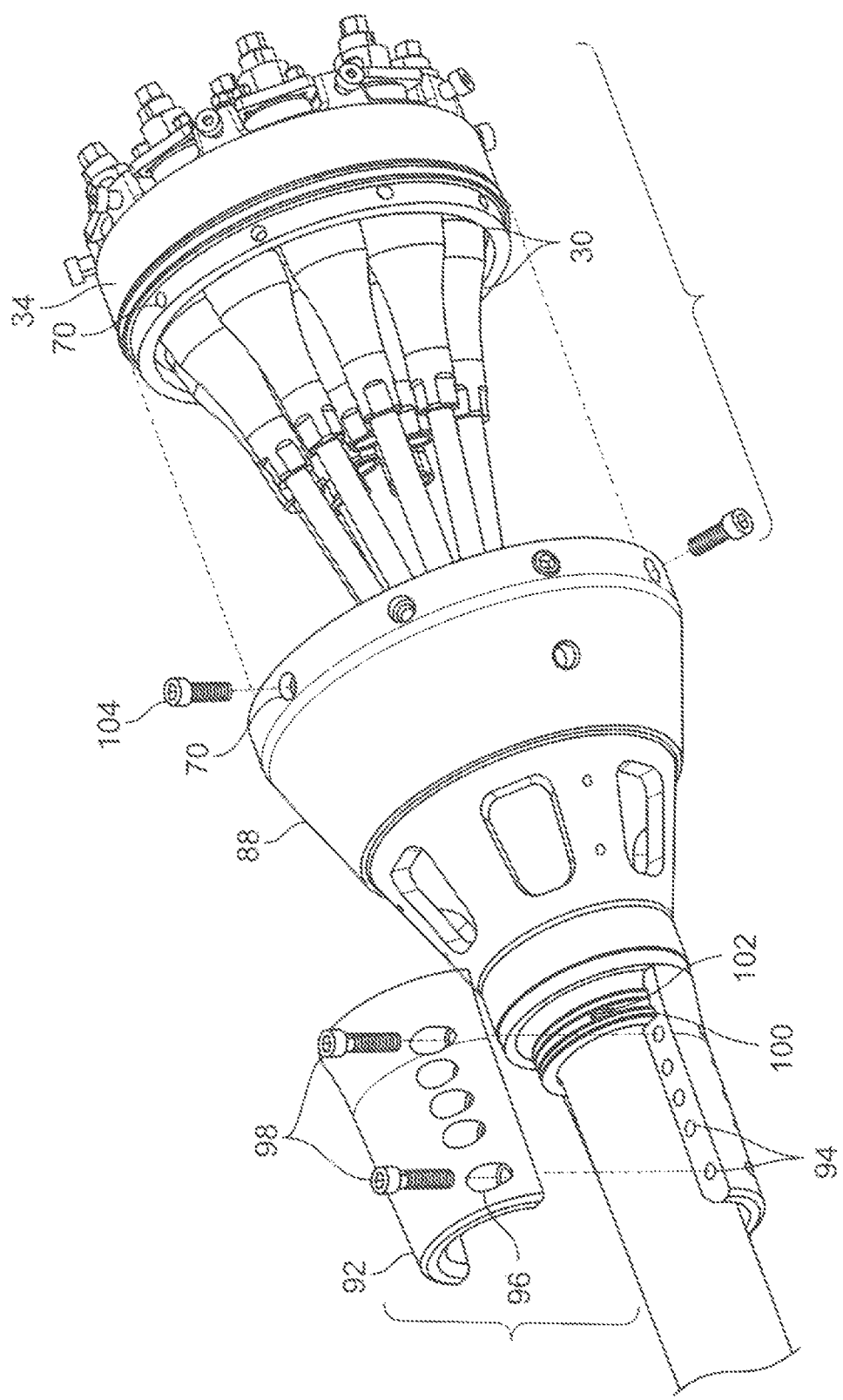
FIG. 7 is an exploded perspective view, showing how the components of some of the inventive embodiments may be assembled.

FIG. 7 shows another embodiment of advanced collar 88 that is configured for use with a "9×3 collection pattern." This version is split into three separate sections (labeled in the view as advanced collar 88 and two distal collar halves 92). The configuration shown allows both internal and external wear inspection. The use of three separate pieces is helpful for three reasons. First, the opening in the distal portion of advanced collar 88 is large enough to allow the various terminations to be fed through. Second, splitting the distal collar into two portions allows it to be removed so that the portion of the cable undergoing the most bending stress and/or wear can be visually inspected. Third, the use of the split allows inward compression when the two distal collar halves are fastened together and this helps maintain strand orientation and organization. The reader should bear in mind that the example shown is one of many possible designs and is selected at least in part to highlight the benefits of a removable and/or compressible collar design. Other illustrative examples include a thread-on annular collar assembly and a single piece swaged-compression collar with similar features.

The various pieces seen are united into one integral assembly in use. Advanced collar 88 is slid up the cable and into engagement with collector 34. Several fasteners 104 are passed through threaded holes 70 in advanced collar 88 and then into threaded holes 70 in collector 34. Advanced collar 88 is thereby connected to collector 34. Other approaches to connecting the various components will occur to those skilled in the art.

The smaller end of advanced collar 88 includes protruding ring 102. This feature engages annular groove 100 in each of the two distal collar halves 92. Fasteners 98 pass through counterbored holes 96 in the upper collar half and into threaded holes 94 in the lower collar half. When all these fasteners are tightened, one unified assembly is created.

Those skilled in the art will realize that many other arrangements could be created for the components illustrated. Some of the important points are (1) reducing the length and/or diameter of the overall cable termination, (2) providing the ability to assemble all the components in a convenient and compact fashion, (3) providing visual access to the strand terminations (more on this subsequently), (4) providing visual access to the portion of the strands lying within the various collar components, and (5) providing a volumetrically efficient strand grouping pattern.

It is often important to limit the rotation of an individual strand once it is connected to a collector. Many strands are made by twisting, braiding, winding, serving, or plaiting sub-groups of filaments together. In other cases the entire strand may be made of parallel filaments encased in a surrounding jacket. For all of these constructions there is a relationship between tension and rotation. In some strand constructions that are not torque-balances, when tension is applied, the strand will naturally tend to rotate ("unwind" itself). In nearly any construction, strand twist may materially impact the filament alignment and mechanical properties. Care should therefore be taken to ensure consistency between strands—both in the fabrication of the assembly and the use of the finished cable. Alignment control being an important objective, a rotation-limiting connection between the strand termination and the collector is preferable.

Figure 2:
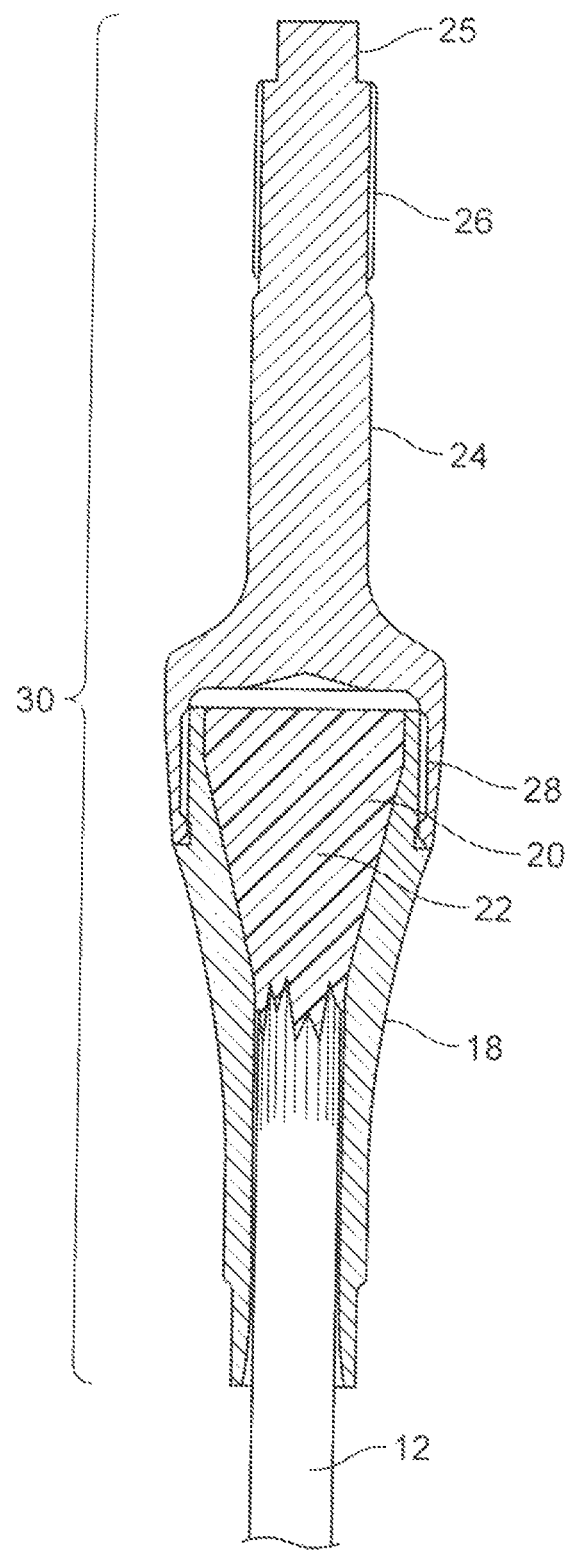
FIG. 2 is a sectional perspective view, showing an exemplary termination applied to a single strand.
Figure 8:
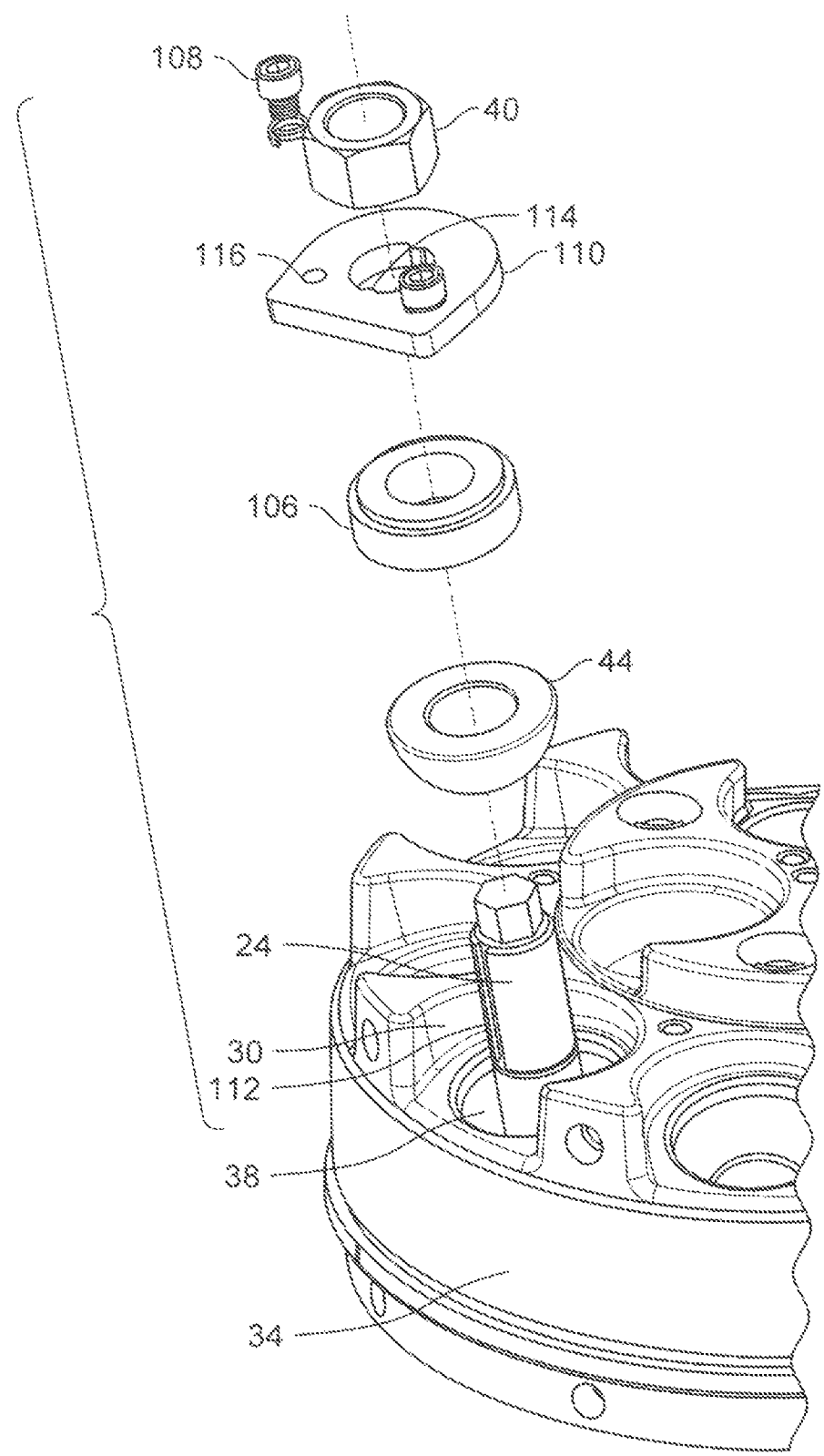
FIG. 8 is an exploded perspective view, showing the addition of rotation-limiting and overload-displaying features to the present invention.

FIG. 8 shows one exemplary embodiment of a rotation-limiting connection between a strand and a collector. The connection shown is generally similar to the connection shown in FIGS. 2 and 3. Loading stud 24 is part of a termination that is attached to the end of an individual strand. As explained previously, the loading stud is used to adjust the tension applied to the strand as it is assembled to the collector 34. Loading stud 24 is passed through the hole in receiver 38. Hemi bearing 44 is slipped over the loading stud.

In this particular example, an additional component is included to alert the user to potential overload conditions. A conventional washer is not used. Instead, frangible washer 106 is used. Frangible washer 106 is a special kind of washer that contains an internal volume of fluorescent dye. When a specific load limit of the washer is exceeded, this bright dye is extruded. The load limit in this example is selected as a critical load on an individual strand. When that critical load is exceeded, frangible washer 106 will extrude its internal dye. This dye will be immediately visible upon inspection of the cable. Thus, with adequate visualization of the end connections, a user will immediately see that a strand has been overloaded and the cable will then be removed from service for additional inspection. In this example, it is appropriate to provide visual inspection ports above the collector. This area is often encased within the overall cable termination. But, if suitable visual inspection ports are provided, then the condition of frangible washer 106 may be readily observed. This fact allows the use of a frangible washer for overload detection, for the detection of a desired "set" tension in a strand, or for some other purpose.

The rotation limitation is provided by the interaction of lockplate 110 and side wall 130. Side wall 130 is provided around receiver 38. Lockplate 110 is shaped so that it may be slipped vertically over loading stud 24 but may not rotate with respect to side wall 130. Tab 114 in the passage through the lock plate is configured to slide into slot 112 in loading stud 24. Thus, lockplate 114 is rotationally locked with respect to loading stud 24 and lockplate 114 is rotationally locked with respect to side wall 130.

Once lockplate 110 is in position nut 40 is threaded over the exposed end of the loading stud and tightened to a desired extent. It is preferable to prevent nut 40 from backing off its tightened position. In order to achieve this objective a fastener 108 is threaded into threaded hole 116 on the lock plate. There is clearance for the head of the fastener adjacent to one of the flats on nut 40, but not sufficient clearance for one of the points of the hex pattern on nut 40 to pass by. Thus, the presence of the fastener 108 secures the nut. The example provided is more complex and therefore costly that would typically be the case. Other devices—such as a cottar key or aviation safety wire—could be used as well. One could also use an adhesive or a spot weld. The devices or methods used are not important so long as rotation is prevented. This rotation lock prevents unwanted longitudinal movement of the strand with respect to the collector—which could alter the balancing of the overall loads among the strands.

Frangible washer 106 is only one exemplary approach to indicating or monitoring the strand load condition. This example is intended to illustrate an important opportunity for measuring and monitoring strand loads within a cable termination. Unlike a unified prior-art termination (such as a standard potted socket which includes all strands in one body), the inventive example allows an easy indication of an overloaded condition and even allows the monitoring of strand loads on an ongoing basis. The monitoring may be done via visual inspection, the monitoring of an electrical signal (such as with a strain gage), or some other approach. The ability to monitor stresses within the overall cable termination is in fact unique, and represents a significant opportunity to manage stress and wear at a more finite level (sub-components of the finished cable assembly). Such measurement or inspection features could be applied to each individual strand termination, to varying groups of strand terminations, or to varying layers of collectors as examples.

Countless components, features, and methods for measuring or inspecting for strands tensions are possible. Other examples include shear rings or pins (in the strand load path), strain gauges, tension or compression load cells, compression washers with positional measurement, pressure monitoring within the strand terminations themselves, measurement of lateral or radial forces exerted by each of the strands, etc. The invention is certainly not limited to any particular approach.

The monitoring features need not be entirely contained within the overall cable termination. For example, if strain gauges are used, wiring may connect the termination to a remote monitoring site. A wireless, acoustic, or optical signal may also be used. The ability to individually and/or collectively monitor the strand loading is a significant part of the present invention.

Figure 4:
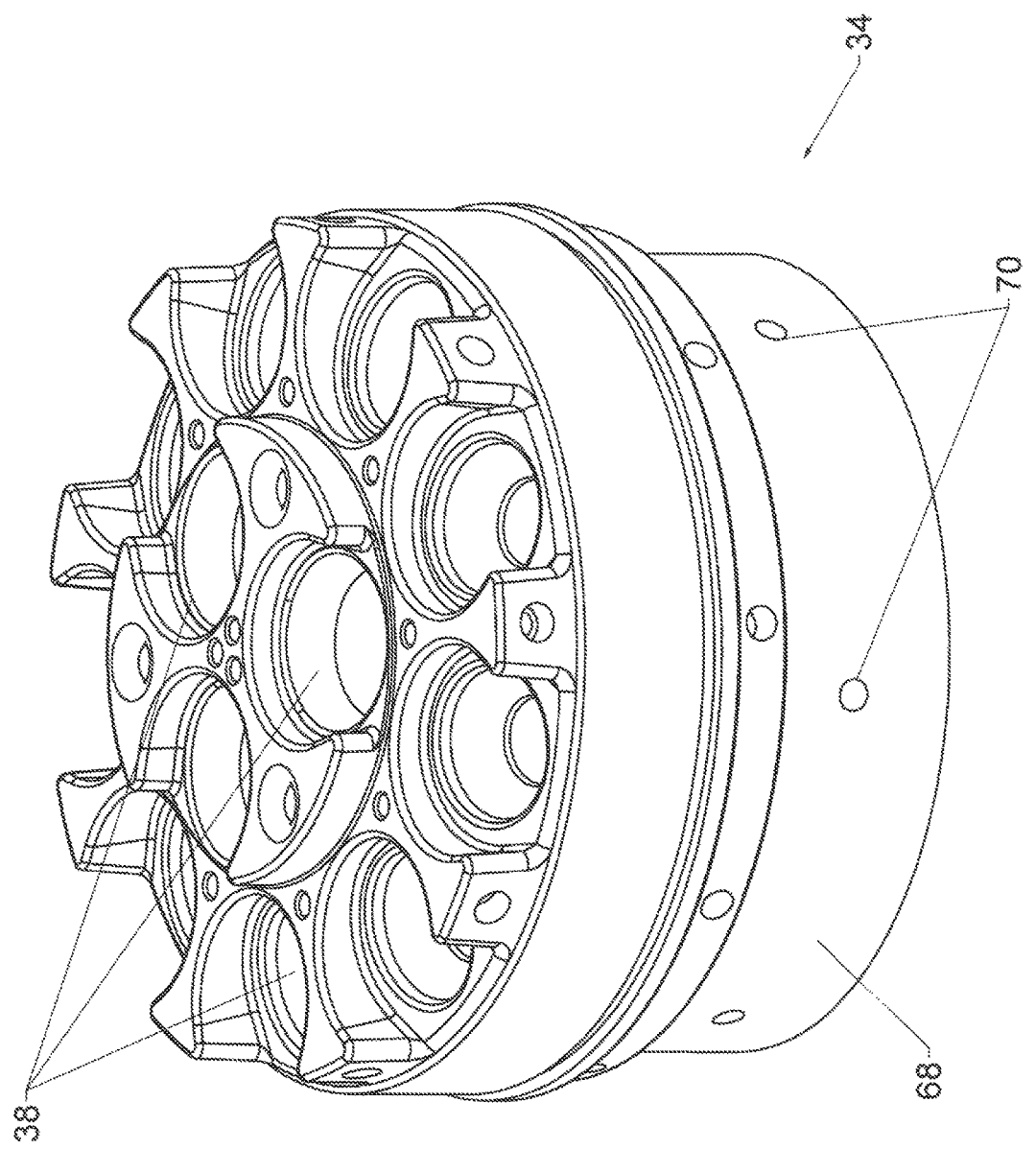
FIG. 4 is a perspective view, showing an exemplary collector.

Returning now to FIG. 7 the reader will observe how tightly the individual terminations 30 are grouped together where they connect to collector 34. If all the terminations lie in the same plane, there is often a limit to how tightly they can be packaged. Some advantage may be obtained by moving some of the terminations into a different plane. FIG. 4 shows a collector 34 employing this approach. The collector shown is designed to receive a 12-strand cable in a "9×3" configuration. The receivers 38 for the central 3 strands have been marginally raised out of the plane for the other receivers. This often allows more lateral clearance for the terminations. In some instances it may be preferable for these center strands to be lower and in some instances it may be preferable for them to be higher (as in the embodiment illustrated).

Figure 9:
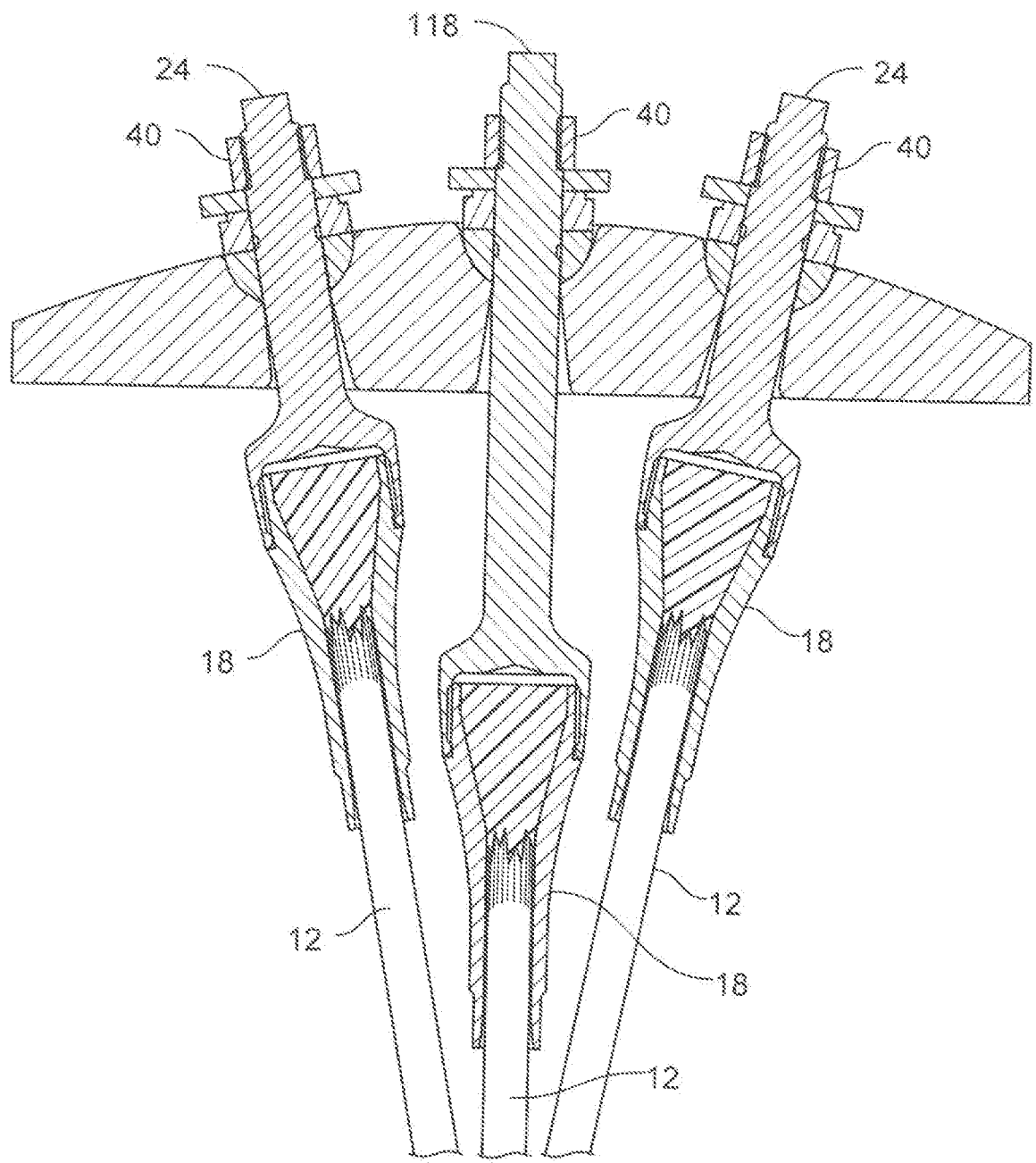
FIG. 9 is a sectional elevation view, showing the use of strands having differing lengths to make a more space-efficient assembly.

FIG. 9 illustrates another embodiment. In this version, the single central strand has been lowered (in the orientation of the view) with respect to the surrounding strands. The strand termination for this central strand is provided with extended stud 118. The reader will observe how moving the central strand termination out of the plane of the other terminations allowed the anchors 18 to be moved laterally closer together. The amount of offset and realized advantages is based on many factors, but principally based on the geometry of the strand termination and strand grouping pattern. The strand terminations are said to be "staggered" in this embodiment. The term "staggered" should be understood to encompass a longitudinal offset (a direction parallel to the cable's central axis), a lateral offset (a direction perpendicular to the cable's central axis), and an angular offset (The strand terminations are angularly offset by a differing angle with respect to the cable's central axis).

Figure 10:
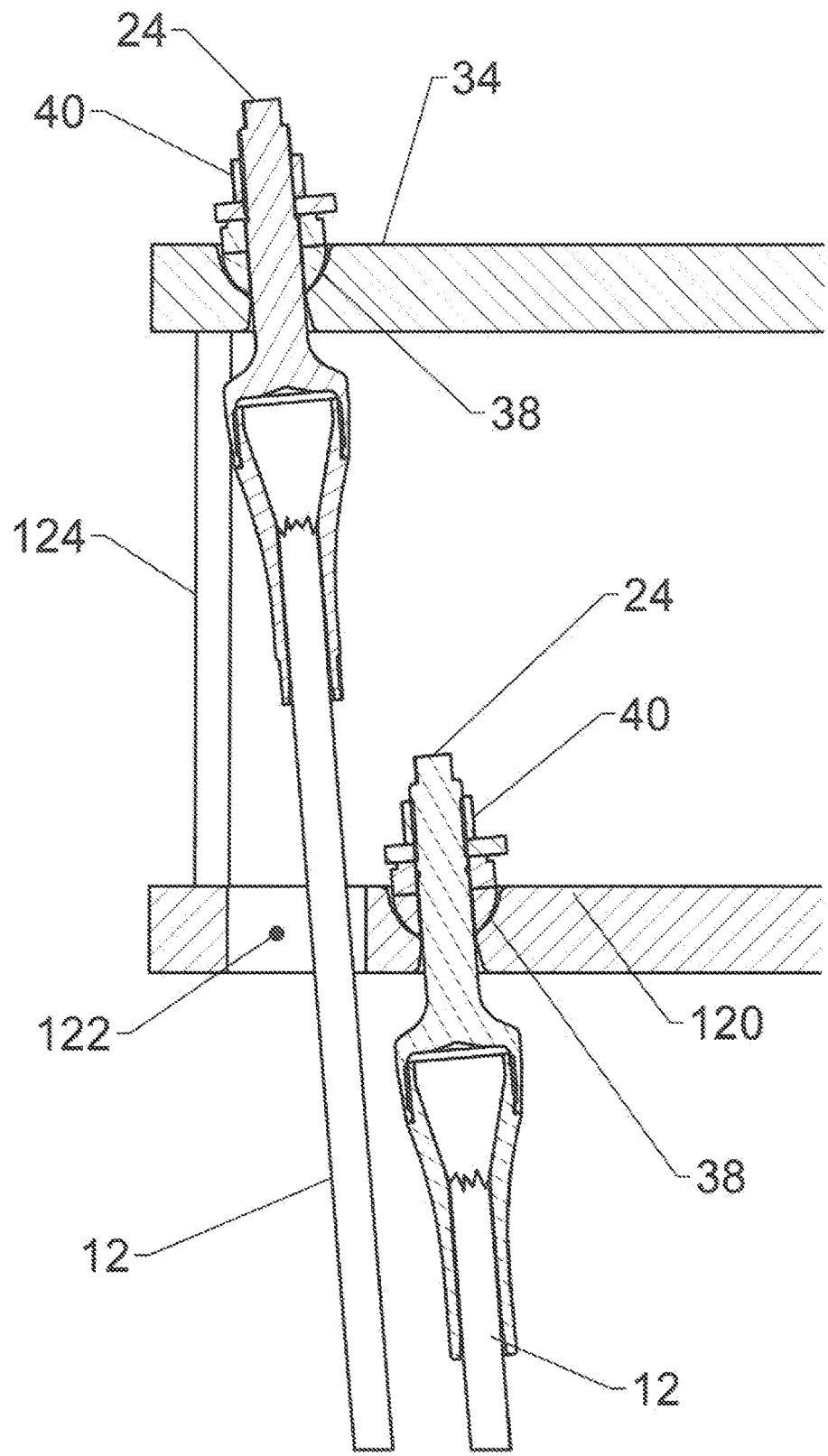
FIG. 10 is a sectional elevation view, showing the use of two separate collectors to make a more space-efficient assembly.

FIG. 10 shows still another example—this time for a "6×6 construction of a 12-strand cable. In a conventional collector, two rings of six receivers would be provided, but they would have to be spaced fairly far apart. In the embodiment shown, six of the receivers 38 have been moved from collector 34 to secondary collector 120. The connections ere therefore made at a different level within the collector. Collector 34 and secondary collector 120 are connected by multiple separators 124. Secondary collector 120 is provided with passages 122 that are large enough (in this example) to allow the terminations destined for collector 34 to pass through. This offset configuration again allows the terminations to be moved laterally closer. Of course, a single collector can provide this functionality if appropriate geometry is included.

Figure 12:
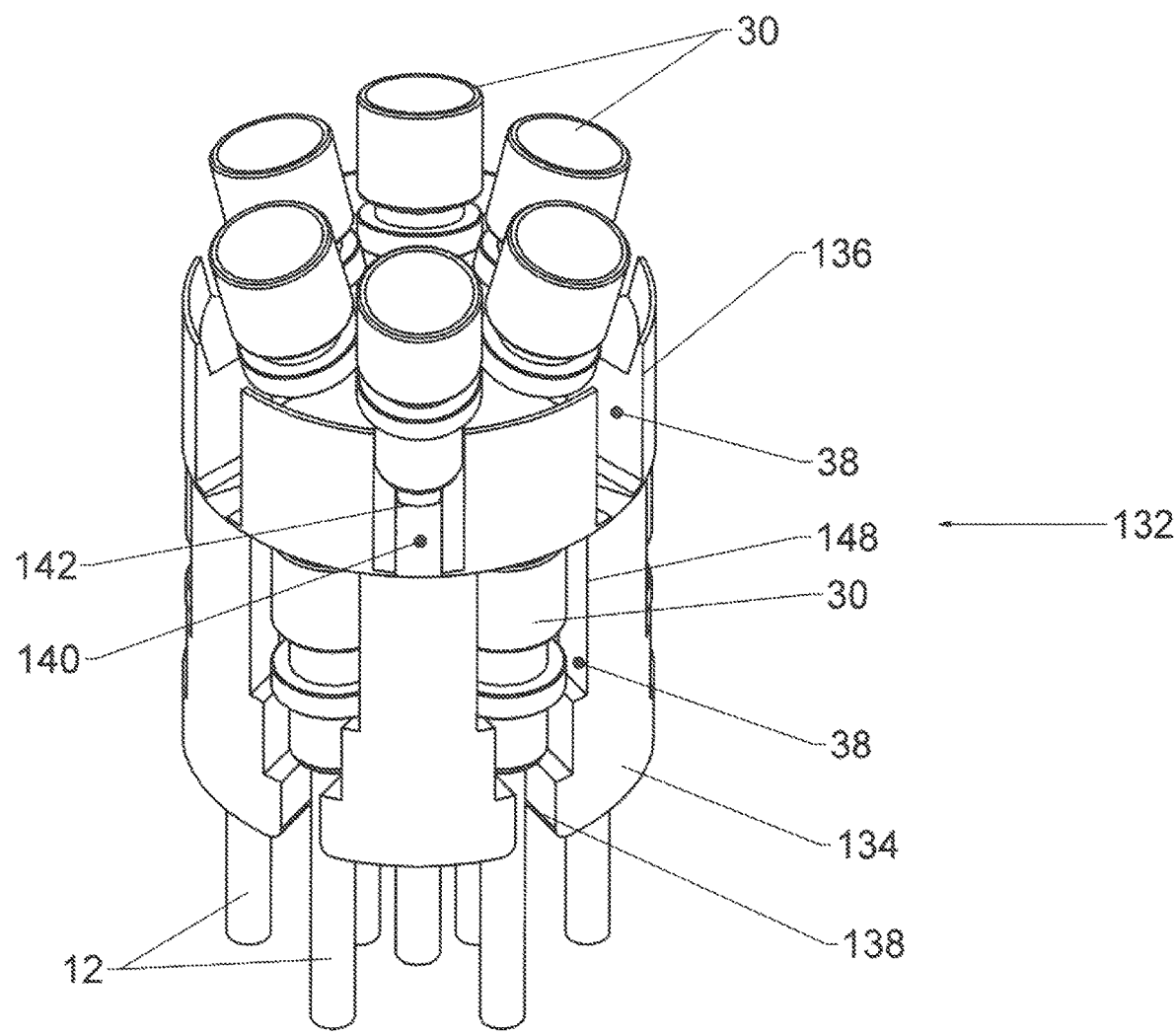
FIG. 12 is a perspective view, showing a split collector designed to accommodate two strand groups on two different levels.

FIGS. 12 through 15 provide additional examples of possible collector geometry. FIG. 12 discloses an embodiment in which the collector is split into two pieces—upper collector 136 and lower collector 134. The cable's twelve strands are dividing into two groups of six strands each (a "6×6" configuration). Six strand terminations 30 are secured in the six receivers 38 in upper collector 136. These receivers are canted inward (toward the upper collector's central axis). Passage 142 passes through upper collector 136. An aligned passage also passes through lower collector 134. These central passages allow the six strands connected to upper collector 136 to pass through both the upper collector and the lower collector. Radial slots 140 allow the strand terminations to be slipped laterally into the upper collector and aligned so that they may be placed within the receivers 38 in the upper collector.

Radial slots 138 and radial accesses 148 allow additional strand terminations 30 to be seated into receivers 38 in lower collector 134. The reader will readily perceive that the strand lengths for the two strand groups are different. The strands that are to be placed within lower collector 134 are typically shorter than the strands that are to be placed in upper collector 136. Connecting the strands at two different planes allows the overall cable termination to be smaller (in this case have a smaller overall diameter) than would be possible if all the strands were connected at a common plane. This example also demonstrates one of the many potential benefits of varying the angle on one or more groups of strand terminations.

Figure 13:
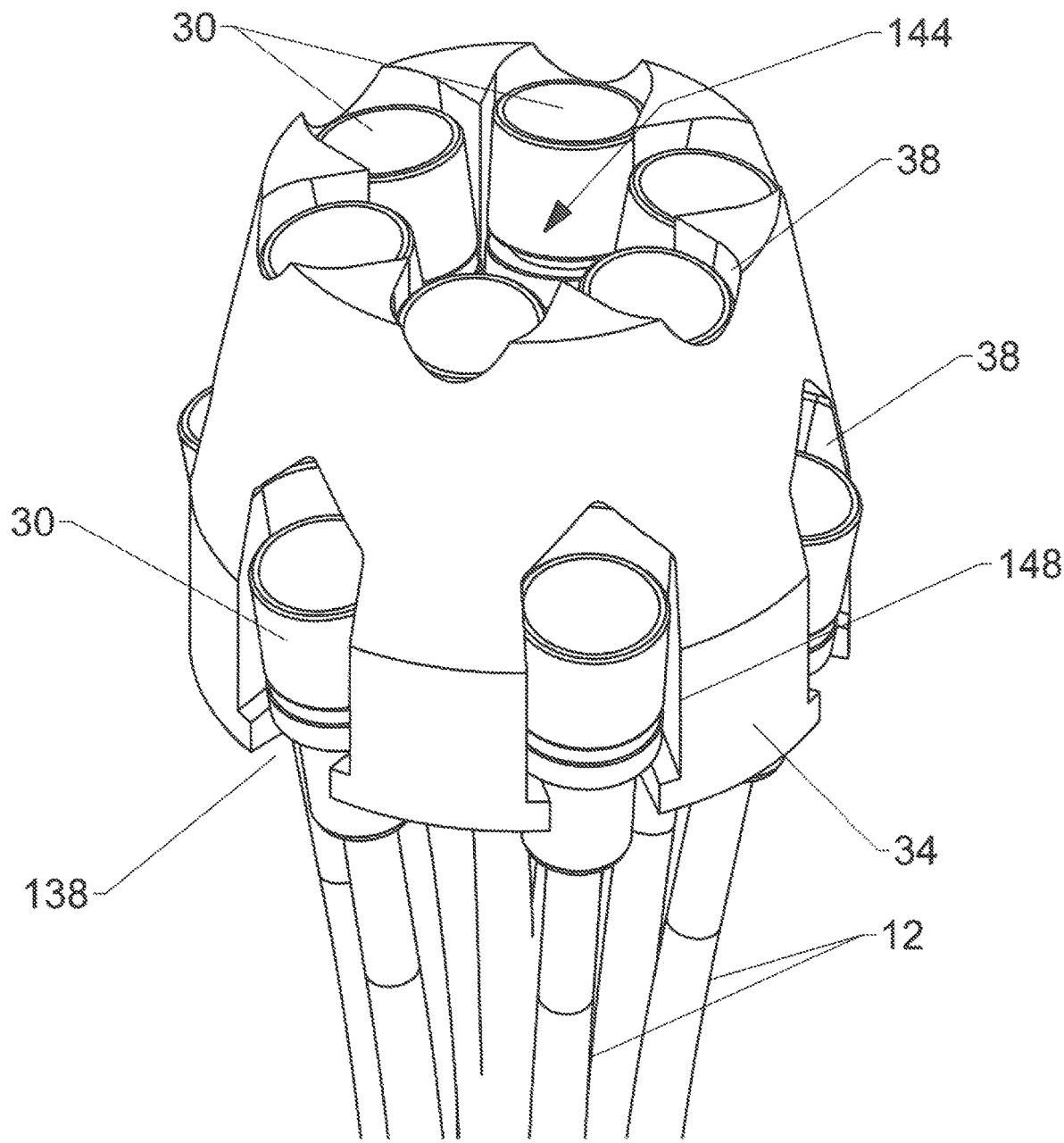
FIG. 13 is a perspective view, showing a single collector configured to accommodate two strand groups on two different levels.

FIG. 13 shows a collector embodiment in which two connection planes are provided by a unified collector. Six strand terminations 30 seat into an "upper deck" of six receivers 38. These are again canted at an angle to the central axis of the collector. Central passage 144 through ten middle of the collector allows for the passage of the six strands connecting to the "upper deck." A "lower deck" of six more receivers 38 is provided. Access to each of these receivers is provided via radial slots 138 and radial accesses 148. As for the prior embodiments, each receiver 38 includes a load-bearing surface that engages the strand-side of the strand termination. This example illustrates how one collection assembly may easily create two different longitudinal and angular strand termination offsets.

Figure 14:
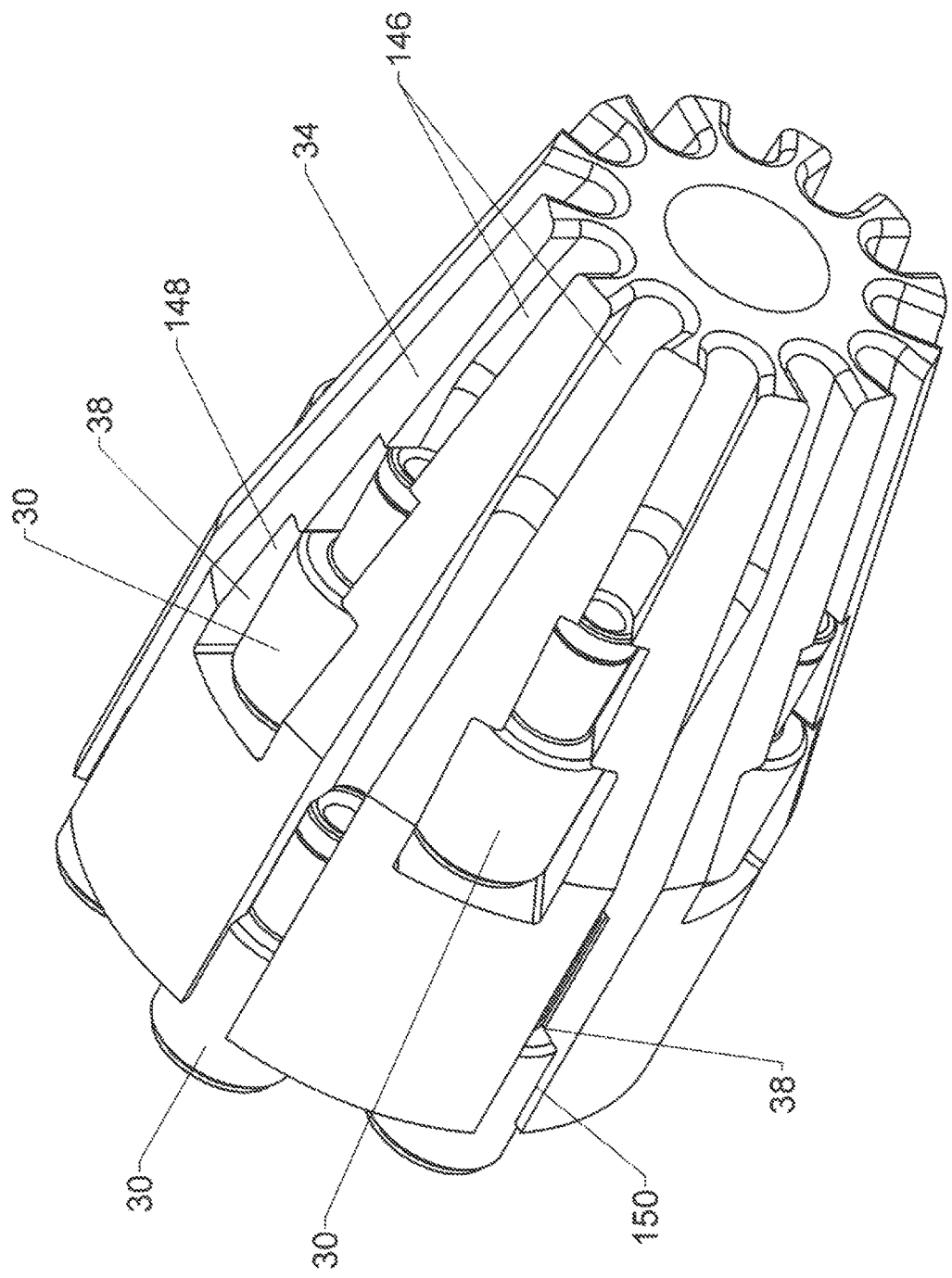
FIG. 14 is a perspective view, showing still another type of collector including lateral strand support and inner-cavity support.

FIG. 14 shows still another unified collector embodiment providing two planes for strand termination connections. In this illustration the strand terminations 30 are shown but—for purposes of visual clarity—the strands are not. A receiver 38 and aligned strand channel 146 is provided for each of the twelve strands. Again, a "lower deck" of six receivers 38 is accessed by six radial accesses 148. An "upper deck" of six more receivers 38 is accessed in a different fashion. For these the strand is placed within the respective strand channel 146 and the connected strand termination 30 is slid longitudinally down into the receiver via a longitudinal access 150. The strand channels are useful in routing and controlling the motion of the strands, in addition to providing a more compact overall termination.

A surrounding collar could be provided, such as shown in FIG. 1. This surrounding collar could be split into two or more pieces and could include a "nose" extension as for the example of FIG. 1. This would likely slip over a portion of the collector shown. In that configuration the strand channels 146 could urge the strands outward in some portions and the surrounding collar could urge them inward. This would allow great flexibility in the rerouting. Further, if the goal is to simply maintain the strands in a straight configuration, the combination of the collector and the collar could ensure that the strands do not deflect significantly from the straight configuration.

Figure 15:
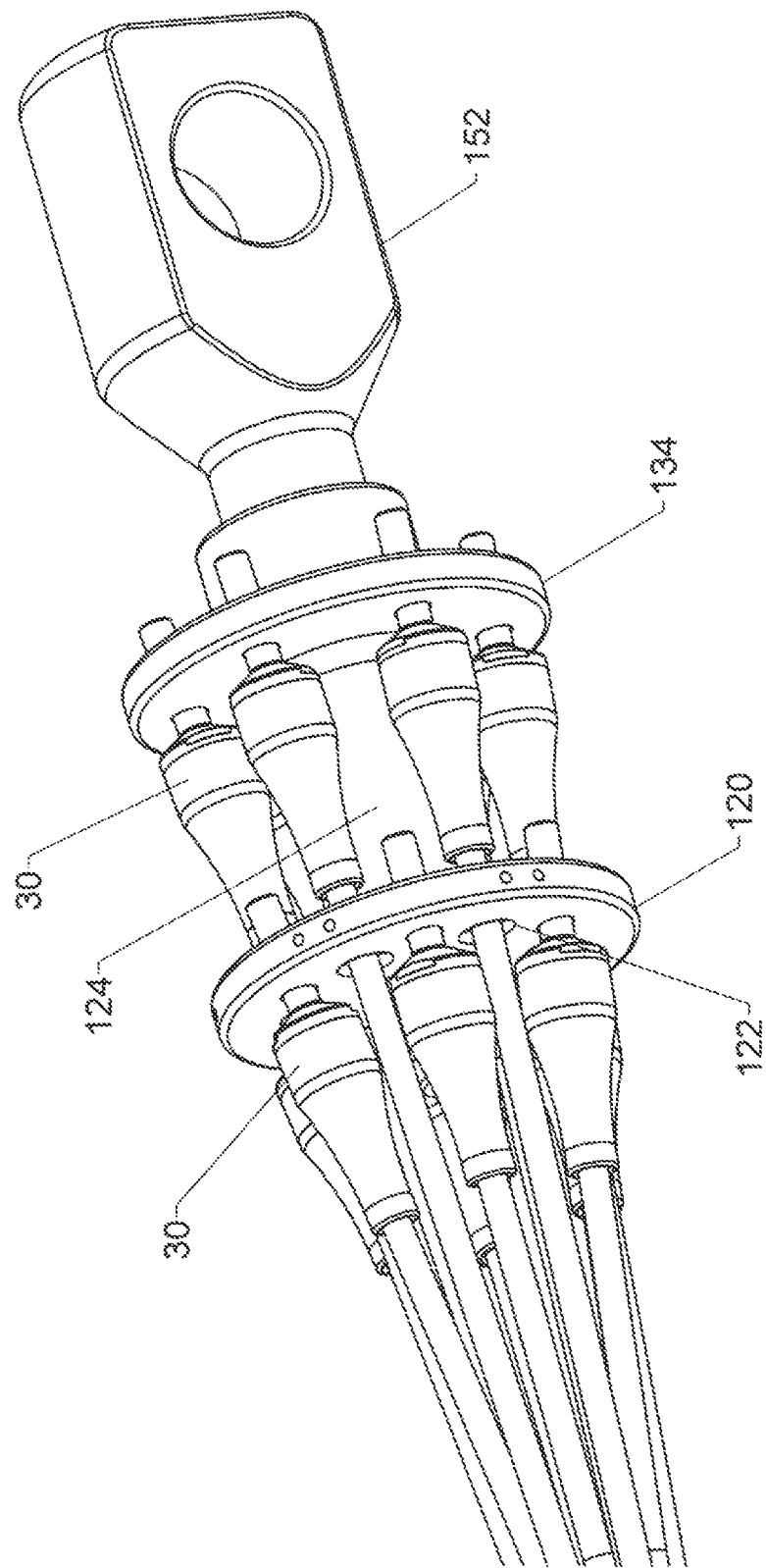
FIG. 15 is a perspective view, showing a two-tiered collector with an attached loading feature.

FIG. 15 shows another embodiment using a collector 34 having a secondary collector 120. Separator 124 unifies the two plate-like structures together. Six strand terminations 30 connect to collector 34, with their respective strands passing through passages 122 in secondary collector 120. The six remaining strand terminations 30 connect to secondary collector 120. Loading feature 152 is connected to the overall assembly. FIG. 15 shows how all the components ultimately transmit the load of the twelve strands to a single component—loading feature 152. As for prior examples, a surrounding collar could be provided. This would likely slip over a portion of the collector shown. An additional distal strand collar could also be provided.

Figure 11:
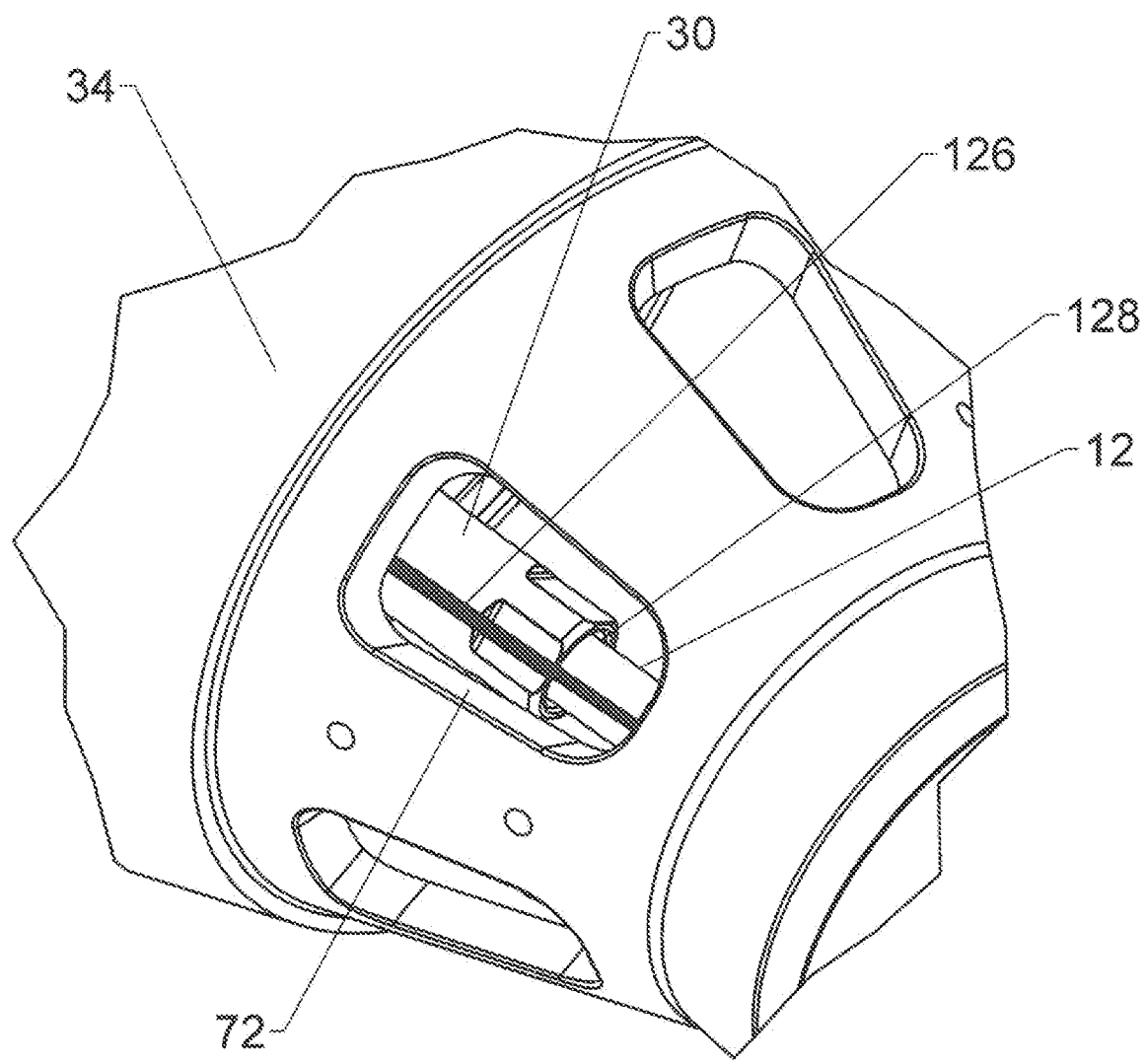
FIG. 11 is a detailed perspective view, showing the addition of a reference stripe to a portion of an anchor that is visible through an inspection port.

As stated previously, it is important to provide visual indicating features that will alert the user to unwanted wear, rotational alignment, lateral alignment, and/or motion. FIG. 11 shows one such feature. Strand 12 and strand termination 30 have been provided with reference stripe 126. This stripe is preferably aligned with inspection port 72 in advanced collar 88. The stripe is positioned so that it is readily visible to a user. If the strand termination rotates during assembly or operation, the stripe will either be misaligned or no longer visible at all. The user will thereby be alerted. In addition, the portion of the stripe on the strand itself may become offset to the portion on the strand termination—thereby indicating that the portion of the strand inside the termination has rotated. The stripe shown is one type of reference mark. Many other reference marks could be used—such as aligned triangles, aligned dots, etc. More sophisticated non-visual features could also be provided to monitor these phenomena.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

REFERENCE NUMERALS IN THE DRAWINGS 12 strand
18 anchor
20 cavity
22 potted region
24 loading stud
26 male thread
28 threaded engagement
30 strand termination
34 collector
38 receiver
40 nut
42 washer
44 hemi bearing
46 opening
64 middle strand collector
66 distal strand collector
68 collar
70 threaded hole
72 inspection port
74 3-strand collector
76 collector
80 free cable
82 divergence angle
84 divergence length
86 contoured converging surface
88 advanced collar
90 contoured diverging surface
92 distal collar half
94 threaded hole
96 counterbored hole
98 fastener
100 annular groove
102 protruding ring
104 fastener
106 frangible washer
108 fastener
110 lock plate
112 slot 114 tab
116 threaded hole
118 extended stud
120 secondary collector
122 passage
124 separator
126 reference stripe
128 emerging region
130 side wall
132 overall cable termination
134 lower collector
136 upper collector
138 radial slot
140 radial slot
142 passage
144 central passage
146 strand channel
148 radial access
150 longitudinal access
152 loading feature Having described my invention, I claim:

1. An overall cable termination for a synthetic cable having multiple strands and a free cable portion, each strand including a strand termination attached thereto, said cable having a central axis, comprising:
   a. an upper collector, having multiple receivers, each of said receivers being connected to one of a first group of said strand terminations, with said first group of said strand terminations being attached to a first group of said strands;
   b. said strands diverging from said free cable portion to said collector;
   c. a strand collar encircling said strands proximate said collector;
   d. said strand collar being connected to said collector;
   e. said strand collar being configured to constrain a lateral motion of at least some of said strands;
   f. a lower collector offset from said upper collector in a direction that is parallel to said central axis of said cable;
   g. said lower collector having multiple receivers, each of said receivers being connected to one of a second group of said strand terminations, with said second group of strand terminations being attached to a second group of said strands;
   h. said lower collector being connected to said upper collector;
   i. said upper collector having an outer perimeter;
   j. said outer perimeter of said upper collector opening into a first plurality of slots wherein each of said first plurality of slots provides a passage between said outer perimeter of said upper collector and one of said multiple receivers in said upper collector;
   k. said lower collector having an outer perimeter;
   l. said outer perimeter of said lower collector opening into a second plurality of slots wherein each of said second plurality of slots provides a passage between said outer perimeter of said lower collector and one of said multiple receivers in said lower collector;
   m. a passage through said upper collector and said lower collector; and
   n. wherein said first group of said strands passes through said passage within said lower collector, with said first group of strands lying closer to said central axis of said cable than said second group of strands.

2. The overall cable termination for a synthetic cable as recited in claim 1, wherein said strand collar includes at least one inspection port configured to allow visual inspection of at least one of said strand terminations while said at least one strand termination is connected to said collector.

3. The overall cable termination for a synthetic cable as recited in claim 1, wherein
   said receivers for said first group of said strand terminations are staggered with respect to said receivers for said second group of strand termination in order to reduce a volume of said overall cable termination.

4. The overall cable termination for a synthetic cable as recited in claim 1, wherein:
   a. said first group of strand terminations are connected to said receivers of said upper collector at a first level; and
   b. said second group of strand terminations are connected to said receivers of said lower collector at a second level that is displaced from said first level.

5. The overall cable termination for a synthetic cable as recited in claim 1, wherein said connection between each of said strand terminations and said collector is a rotation-limiting connection.

6. The overall cable termination for a synthetic cable as recited in claim 1, further comprising a load indicator for at least one connection between one of said strands and said collector.

7. An overall cable termination for a synthetic cable having multiple strands and a free cable portion, each strand including a strand termination attached thereto, said cable having a central axis, comprising:
   a. an upper collector, having multiple receivers, each of said receivers being connected to one of a first group of said strand terminations, with said first group of said strand terminations being attached to a first group of said strands;
   b. said strands diverging from said free cable portion to said collector;
   c. a strand collar encircling said strands proximate said collector;
   d. said strand collar being connected to said collector;
   e. said strand collar being configured to reroute at least some of said strands as said rerouted strands travel from said strand terminations to said free cable;
   f. a lower collector offset from said upper collector in a direction that is parallel to said central axis of said cable;
   g. said lower collector having multiple receivers, each of said receivers being connected to one of a second group of said strand terminations, with said second group of strand terminations being attached to a second group of said strands;
   h. said lower collector being connected to said upper collector;
   i. said upper collector having an outer perimeter;
   j. said outer perimeter of said upper collector opening into a first plurality of slots wherein each of said first plurality of slots provides a passage between said outer perimeter of said upper collector and one of said multiple receivers in said upper collector;
   k. said lower collector having an outer perimeter;
   l. said outer perimeter of said lower collector opening into a second plurality of slots wherein each of said second plurality of slots provides a passage between said outer perimeter of said lower collector and one of said multiple receivers in said lower collector;
   m. a passage through said upper collector and said lower collector; and
   n. wherein said first group of said strands passes through said passage within said lower collector, with said first group of strands lying closer to said central axis of said cable than said second group of strands.

8. The overall cable termination for a synthetic cable as recited in claim 7, wherein said strand collar includes at least one inspection port configured to allow visual inspection of at least one of said strand terminations while said at least one strand termination is connected to said collector.

9. The overall cable termination for a synthetic cable as recited in claim 7, wherein
   said receivers for said first group of said strand terminations are staggered with respect to said receivers for said second group of said strand terminations in order to reduce a volume of said overall cable termination.

10. The overall cable termination for a synthetic cable as recited in claim 7, wherein:
    a. said first group of strand terminations are connected to said receivers of said upper collector at a first level; and
    b. said second group of strand terminations are connected to said receivers of said lower collector at a second level that is displaced from said first level.

\* \* \* \* \*